United States Patent [19]

Crumley

[11] Patent Number: 4,785,572

[45] Date of Patent: Nov. 22, 1988

[54] COMBINED SINKER AND FISHING LURE

[76] Inventor: John E. Crumley, 6200 Brookville Rd, Lot. 149, Indianapolis, Ind. 46219

[21] Appl. No.: 167,582

[22] Filed: Mar. 14, 1988

[51] Int. Cl.[4] ............................................. A01K 95/00
[52] U.S. Cl. .................................... 43/44.9; 43/42.39; 43/42.05
[58] Field of Search ................ 43/42.24, 42.39, 42.48, 43/43.14, 44.81, 42.05, 42.36, 42.45, 42.50, 44.87, 44.9, 44.97

[56] References Cited

U.S. PATENT DOCUMENTS

| | | |
|---|---|---|
| 1,802,260 | 4/1931 | Kopsho . |
| 1,913,282 | 6/1933 | Major . |
| 1,953,692 | 4/1934 | Shoff . |
| 2,043,609 | 6/1936 | Derry, Sr. . |
| 2,413,371 | 12/1946 | Parker . |
| 3,104,487 | 9/1963 | Havel ................................... 43/44.9 |
| 3,461,598 | 8/1969 | Brewster . |
| 3,497,987 | 3/1970 | Perrin . |
| 3,564,754 | 2/1971 | Brawley et al. . |
| 3,613,289 | 10/1971 | Wehren . |
| 3,769,738 | 11/1973 | Begley . |
| 3,828,463 | 8/1974 | Perrin ................................. 43/42.39 |
| 4,138,791 | 2/1979 | Anson . |
| 4,164,826 | 8/1979 | Metzler et al. ..................... 43/42.39 |
| 4,199,888 | 4/1980 | Barnes . |
| 4,320,592 | 3/1982 | Kirsch ................................ 43/42.39 |
| 4,468,881 | 9/1984 | Gordon, III . |
| 4,649,663 | 3/1987 | Strickland .......................... 43/44.9 |

Primary Examiner—M. Jordan
Attorney, Agent, or Firm—Woodard, Emhardt, Naughton, Moriarty & McNett

[57] ABSTRACT

A combination sinker and fishing lure includes a weighted sinker having a head portion with a head maximum outer diameter, a neck portion having a neck outer diameter less than the head maximum outer diameter, and a knob portion having a knob outer diameter greater than the neck outer diameter. The sinker further includes a longitudinal bore extending continuously through each of the head, neck and knob portions, the bore being adapted to have a fishing line threaded therethrough. For the lure, a plurality of resilient strips encircle the sinker and are secured to the sinker at the neck portion by a flexible tie wound around the strips and the neck portion. In use, the combination sinker and fishing lure is threaded onto a fishing line. An additional lure, such as a worm lure, can be attached to the end of the fishing line, with the combination sinker and fishing lure abutting the additional lure.

6 Claims, 1 Drawing Sheet

COMBINED SINKER AND FISHING LURE

BACKGROUND OF THE INVENTION

This invention relates to fishing tackle and, in particular, to a combined fishing line sinker and fishing lure.

One of the most common annoyances to fishermen is the loss of a sinker or a fishing lure trapped in the rocky beds of oceans or lakes. As the weighted line is reeled in by the fisherman, the sinker drags along the bottom and encounters a variety of obstructions on the lake bed. A problem common to many types of fishing lures is that the fishing line is attached to the lure by way of an eyelet projecting from the side of the lure, such as a Stanley jig. Thus, as the fishing line is reeled in by the fisherman, an uneven pulling force is exerted on the lure. Difficulties arise when the lure contacts a rock or other obstructions on the lake bed, as the uneven pulling force causes the fishing lure to become entangled or lodged in the rocks.

The patent to Brewster, U.S. Pat. No. 3,461,598, represents one attempt to produce a "weedless" weight for a fishing line. This weight is interposed in the fishing line by tying the line and leader to loops at the ends of the weight. Moreover, the Brewster device uses stiff bristles to prevent lodgment of the weight, so this weight is not susceptible to use as a combined lure and sinker. On the other hand, the device of Barnes, U.S. Pat. No. 4,199,888, is a combined sinker and fishing lure. This device does not include any feature to make the device weedless. Moreover, it too is interposed in the fishing line by tying onto eyelets at the ends of the device. These devices are cumbersome and lack the flexibility for use with a variety of additional lures, such as worm lures.

It is therefore an object of the present invention to provide a combined sinker and fishing lure that is generally weedless, or that substantially eliminates the risk of becoming lodged in rocks on the ocean or lake bed.

It is another object of the invention to combine a fishing lure with a sinker that can be used with other fishing lures, such as a worm lure. Other objects and benefits of the present invention will be apparent from the following written description of the preferred embodiment, as shown in the accompanying figures.

SUMMARY OF THE INVENTION

A combination sinker and fishing lure includes a weighted sinker having a head portion with a head maximum outer diameter, a neck portion having a neck outer diameter less than the head maximum outer diameter, and a knob portion having a knob outer diameter greater than the neck outer diameter. The sinker further includes a longitudinal bore extending continuously through each of the head, neck and knob portions, the bore being adapted to have a fishing line threaded therethrough. For the lure, a plurality of resilient strips encircle the sinker and are secured to the sinker at the neck portion by a flexible tie wound around the strips and the neck portion.

DESCRIPTION OF THE PREFERRED EMBODIMENT

Figure 1:
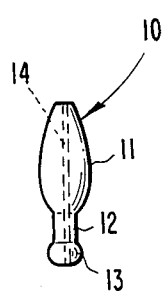
FIG. 1 is a side elevational view illustrating the sinker portion of the combined sinker and fishing lure of the preferred embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
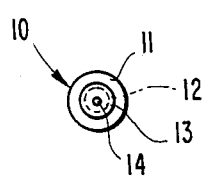
FIG. 2 is a bottom elevational view of the sinker shown in FIG. 1.

The combined sinker and fishing lure of the present invention comprises a sinker 10, as shown in FIGS. 1 and 2. The sinker 10 includes a head portion 11 that is generally elliptical in axial cross-section. In the preferred embodiment, the head portion 11 is similar in appearance to a conventional Texas rig sinker, that is, the maximum diameter of the head portion is nearer the bottom end of the head portion in the manner of a teardrop. A neck portion 12 is integral with the head portion 11 at the bottom end of the head portion. The neck portion has a diameter smaller than the maximum outer diameter of the head portion, approximately one-half the head diameter in the preferred embodiment. The neck portion 12 terminates with a generally spherical knob 13 to form a spool-shaped section for the sinker 10. A longitudinal bore 14 extends through the entire length of the sinker 10, passing through the head portion 11, the neck portion 12, and the knob 13. The bore 14 has a diameter sufficient to accept a fishing line threaded therethrough.

In the preferred embodiment, the sinker 10 is integrally cast of lead. Another material may be substituted that is sufficiently dense, to provide adequate weight for the fishing line without being excessively large, as well as sufficiently malleable, to allow the formation of the longitudinal bore. The preferred method for forming the longitudinal bore 14 has been to insert a wire into the casting mold, pour the lead, and remove the wire once the sinker has cooled. However, it may also be possible to cast a solid sinker and later drill through the top or bottom of the sinker 10 to form the bore. The size of the sinker 10 can vary depending upon the fishing application. In one version of the combined sinker and fishing lure particularly suitable for bass fishing, the sinker is about $1\frac{1}{4}$ inches long with a $\frac{3}{8}$ inch long head portion. The maximum outer diameter of the elliptically-shaped head portion is about 5/16 inch in this version with a $\frac{1}{4}$ inch diameter neck and a 3/16 inch diameter knob.

The diameter of the longitudinal bore 14 must be sufficiently large to allow the sinker 10 to be threaded onto a conventional fishing line. The bore diameter may be changed to accept a heavier fishing line. In the preferred embodiment, the bore diameter is also large enough to allow an item, such as a toothpick, to be lodged in the bore when the sinker has been threaded onto a fishing line, to prevent the sinker from migrating up the line. When an additional lure is tied onto the end of a fishing line onto which the sinker 10 is threaded, the sinker is restrained from falling off the line.

The sinker 10 can be painted with an epoxy paint or with a lacquer or enamel in a dipping process. To enhance the attractiveness of the combined sinker and fishing lure, the sinker 10 can be painted in a variety of color schemes. For instance, the head portion 11 and knob 13 can be painted in the same color or in a complementary pair of colors.

Figure 3:
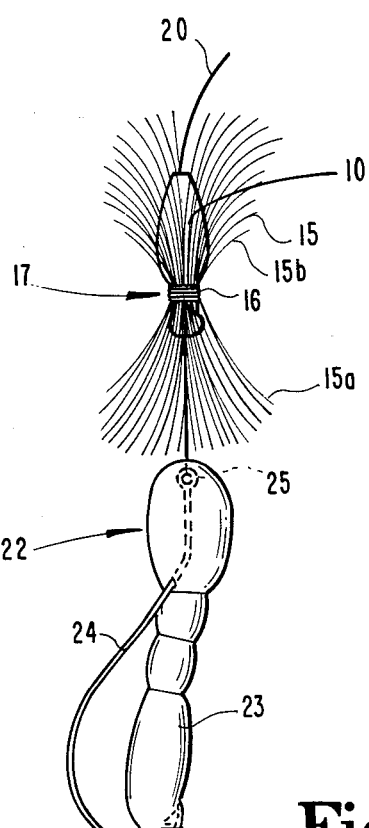
FIG. 3 is a perspective view of the combined sinker and fishing lure as it is used in connection with a fishing line and additional fishing lure.
Figure 3:
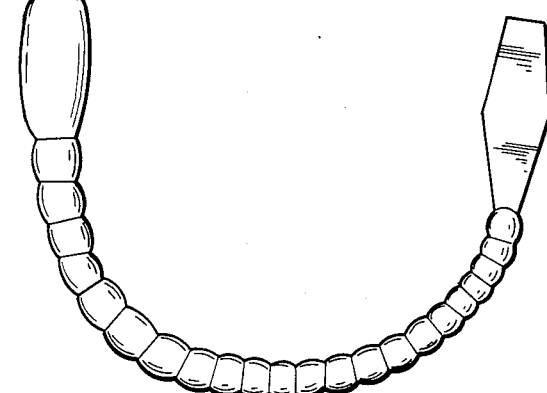

In the preferred embodiment, the combined sinker and fishing lure 17, shown in FIG. 3, includes a plurality of resilient strips 15, for use as a bass lure, for instance. The plurality of strips 15 are secured around the neck portion 12 of the sinker 10 and are held in place by a flexible tie 16 that is repeatedly wound around the neck portion and the resilient strips. The flexible tie 16 is wound around the strips for the entire length of the neck portion 12, from the bottom of the head portion 11 to the upper portion of the knob 13. Winding in this fashion insures that the resilient strips 15 will not become disengaged from the sinker or be pulled loose from the flexible tie 16. The resilient strips 15 can be formed from a pre-perforated rubber sheet that is commercially available. The rubber sheet can be wound around the sinker 10 and tied in place about the neck portion 12 by the flexible tie 16, after which the top and bottom edges of the rubber sheets are cut to allow the pre-perforated strips to fall free.

In the preferred embodiment, the resilient strips 15 are about 4½ inches long when cut from the pre-perforated rubber sheet. The resilient strips 15 are arranged so that the lower portion 15a of the strips falling over the knob 13 are about 1⅛ inches long, while the upper portion 15b of the strips falling over the head portion 11 are about 3⅛ inches long. About ¼ inches of the strips are situated at the neck portion 13 and are contained by the flexible tie 16. With this orientation of the resilient strips 15, the upper portion of the strips will bend back over the neck portion 12 and the knob 13 as the combined sinker and fishing lure 17 is pulled through the water. This provides a lure having a double-action inner and outer skirt, the inner skirt being formed by the lower portion 15a of the resilient strips and the outer skirt being formed by the upper portion 15b of the strips 15. This double-action feature has been found to provide a life-like lure presentation, and has been used in connection with a worm lure, such as described in the patent to Gordon, III, U.S. Pat. No. 4,468,881. No similar double-action feature lure has been found in combination with a sinker or fishing weight. Longer resilient strips 15 can be used with a longer sinker 10, or to provide a double-action skirt that partially shrouds an additional lure attached to the fishing line adjacent the combined sinker and lure 17.

A primary benefit of the present invention is illustrated with reference to FIG. 3, in which the combined sinker and fishing lure is shown threaded on a fishing line 20. The end of the fishing line is affixed to a standard commercial worm lure 22. The line is tied to eye 25 at the end of hook 24. The fishing worm 22 includes a plastic worm body 23 through which the hook 24 is threaded so that the eye 25 is situated on the longitudinal axis of the worm body 23. As is illustrated in FIG. 3, the complete tackle arrangement is centered or in longitudinal alignment with the fishing line 20. That is, unlike the Stanley jigs, the combined sinker and fishing lure of the present invention along with the fishing worm 22 are always pulled on the center of the respective lures. Thus, when these lures contact rocks or other obstructions on the lake bottom, they are less likely to be lodged in the rocks due to an off-center pull by the fishing line. Moreover, the generally elliptical or teardrop shape of the head portion 11 of the sinker 10 allows the sinker to more easily avoid the lake bed obstructions, since it presents a streamlined profile. Finally, the double-action of the inner and outer skirts formed by the resilient strips 15 adds a little resistance to lodgment.

In addition to the "weedless" nature of the combined sinker and fishing lure 17, another benefit is derived from the ability of the lure to be threaded onto the fishing line. This feature enhances the versatility of the lure 17 by allowing it to be used with a wide variety of fishing lures, other than the fishing worm lure 22 shown in FIG. 3. Yet another benefit of the present invention is derived from the attachment of the resilient strips 15 to the sinker 10 so that the combined sinker and fishing lure 17 also functions as a lure, unlike most other sinkers of the prior art. Thus, a fisherman need only attach a fishing worm, such as worm 22, in order to produce an attractive lure for fish, such as bass.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:
1. A combination sinker and fishing lure, comprising:
a weighted sinker having a head portion with a head maximum outer diameter, a neck portion having a neck outer diameter less than said head outer diameter, and a knob portion having a knob outer diameter greater than said neck outer diameter, and further having a bore extending continuously through each of said head, neck and knob portions, said bore being adapted to have a fishing line threaded therethrough; and
a plurality of resilient strips encircling said sinker and including means for securing said plurality of strips to said sinker at said neck portion.
2. The combination sinker and fishing lure according to claim 1, wherein:
said plurality of resilient strips include an upper portion encircling said head portion and a lower portion encircling said knob portion, said upper portion being longer than said lower portion, whereby when said combination sinker and fishing lure is drawn through the water, said upper portion bends towards said lower portion to overlie said lower portion.
3. The combination sinker and fishing lure according to claim 1, wherein said head portion is generally elliptical in axial cross-section between a top end and a bottom end, and having said head maximum outer diameter nearer said bottom end;
and wherein said neck portion is integral with said head portion at said bottom end.
4. The combination sinker and fishing lure according to claim 1, wherein said securing means includes a flexible tie wound around said plurality of strips and said neck portion.
5. The combination sinker and fishing lure according to claim 4, wherein:
said plurality of resilient strips include an upper portion encircling said head portion and a lower por- tion encircling said knob portion, said upper portion being longer than said lower portion, whereby when said combination sinker and fishing lure is drawn through the water, said upper portion bends towards said lower portion to overlie said lower portion.

6. The combination sinker and fishing lure according to claim 1, further including a continuous perforated sheet encircling said sinker and secured to said sinker at said neck portion, wherein said plurality of resilient strips are formed by separating said sheet at said perforations.

* * * * *